United States Patent Office 3,369,047
Patented Feb. 13, 1968

3,369,047
BIS (AMINO) ACETYLENE COMPOUNDS AND METHOD OF PREPARING AMINO ACETYLENE COMPOUNDS
Heinz G. Viehe, Linkebeek, Belgium, assignor to Union Carbide Corporation, a corporation of New York
No Drawing. Continuation-in-part of applications Ser. No. 376,203 and Ser. No. 376,204, June 18, 1964. This application Oct. 27, 1964, Ser. No. 406,875
Claims priority, application Germany, Dec. 27, 1963, E 26,130
9 Claims. (Cl. 260—570.8)

ABSTRACT OF THE DISCLOSURE

Bis (amino) acetylene compounds useful as hydrogen halide acceptors and the process of preparing amino acetylene compounds by reacting a halogen-substituted ethane or ethylene with either a tertiary amine or an alkali metal amide in a non-protic liquid organic solvent.

---

This application is a continuation-in-part of co-pending applications Ser. No. 376,203 and Ser. No. 376,204, both filed June 18, 1964, both of which are now abandoned.

This invention relates to aminoacetylenes. More particularly, the invention is directed to a process for producing aminoacetylenes by the reaction of a halogen-substituted ethane or ethylene compound with an organo-nitrogen compound.

Aminoacetylenes, such as $C_6H_5C{\equiv}CN(C_2H_5)_2$ have been described in the literature, for example, Liebigs Ann. Chem. 1960, 638, pp. 36 and 41. However, the aminoacetylene compounds were obtained in very small yield.

It is an object of the present invention to provide a method for producing aminoacetylenes in good yield. It is another object of the invention to provide a process for producing aminoacetylenes by the reaction of a halogen-substituted ethane or ethylene compound with an organo-nitrogen compound. A still further object of the invention is to provide a novel class of aminoacetylenes.

The aminoacetylenes which can be produced by the process of this invention are those represented by the formula (A) 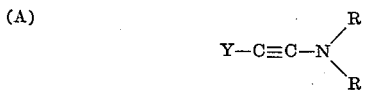

wherein each R represents a monovalent hydrocarbon group, two R groups on the same nitrogen atom can together form an alkylene group, and Y represents hydrogen, a monovalent hydrocarbon group or an $NR_2$ group.

The process of the present invention comprises the steps of (1) mixing together in a non-protic liquid organic solvent (a) one or more compounds represented by one of the Formulas B, C, D, and E.

(B) 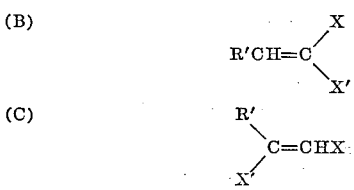

(C)

(D) 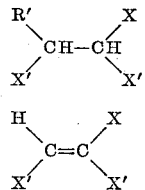

(E) 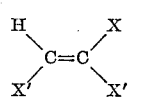

and (b) one or more compounds represented by one of the Formulas F and G (F) 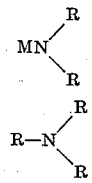

(G)

and (2) maintaining this mixture at a temperature between about —25° C. and about 150° C. until a compound of Formula A is produced. In the above Formulas B, C, D, E, F, and G, the R groups have the meanings defined hereinabove with reference to Formula A, R' represents hydrogen or a monovalent hydrocarbon group, X represents any halogen, namely fluorine, chlorine, bromine, iodine and astatine, preferably fluorine or chlorine, X' represents any halogen and M represents an alkali metal, namely, lithium, sodium, potassium, rubidium, cesium or francium.

In the compounds of Formulas A, F, and G, the R groups can be the same or different throughout the same molecule and, as stated above, two R groups on the same nitrogen atom can together form a divalent alkylene group.

The R groups and the R' groups (when R' represents monovalent hydrocarbon) can be alkyl, aryl, alkaryl, aralkyl, alkenyl, alkynyl, cycloalkyl, cycloalkenyl, and the like groups. For example, R and R' can be methyl, ethyl, n-butyl, tertiarybutyl, 2,2-dimethyl-n-propyl, iso-octyl, octadecyl, phenyl, phenylethyl, terphenyl, cumyl, mesityl, cyclopentyl, ethylcyclohexenyl, allyl, or butyne-2-yl groups, and the like, and two R groups on the same nitrogen atom can together be tetramethylene, 3-ethylhexamethylene, decamethylene, and the like.

In Formulas A, B, C, D, E, F, and G, the R groups and R' groups preferably contain from 1 to 18 carbon atoms and the R' groups are most preferably monovalent hydrocarbon groups containing from 4 to 18 carbon atoms which are bonded to the acetylenic moiety $C{\equiv}C$ through a tertiary carbon atom of the R' group. As used herein, the term "tertiary carbon atom" includes a carbon atom of a benzene ring system.

Preferably, the halogen atom X' is fluorine, chlorine or bromine, and X is preferably fluorine where R' in the compounds of Formulas B, C, D, or E is hydrogen or an alkyl or cycloalkyl group.

The compounds of Formula F can also be reagents of the Grignard type, in which case, M represents the moiety MgX. Also M in Formula F can be an alkaline earth metal, namely, beryllium, magnesium, calcium, strontium or barium, in which case, two $NR_2$ moieties are associated with each M.

Typical compounds of Formula B are the following:

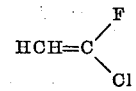

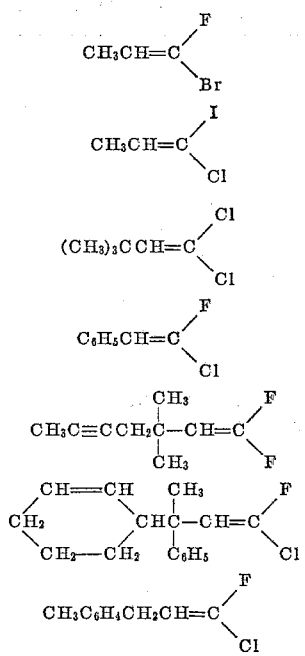
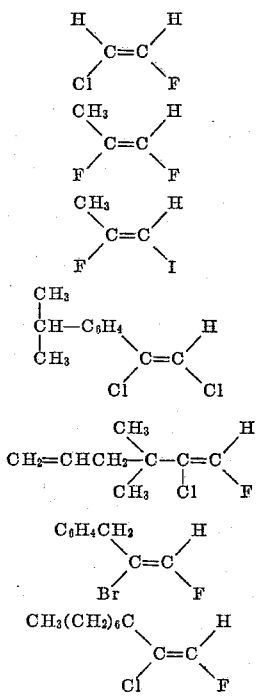
Typical compounds of Formula D are the following:
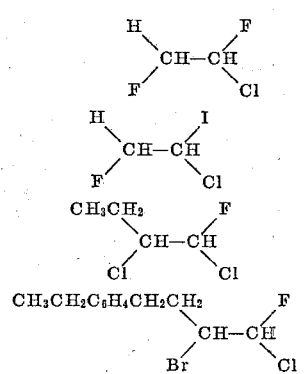
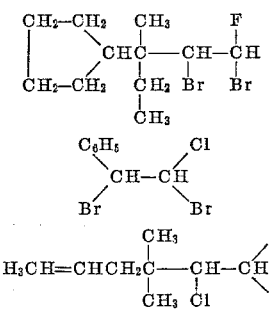
Typical compounds of Formula E are the following:
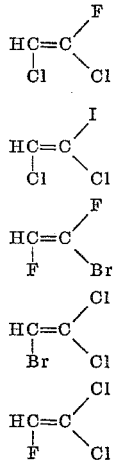
Typical compounds of Formula F are the following:
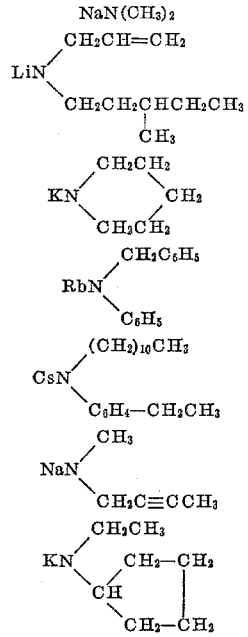
Typical compounds of Formula G are the following:
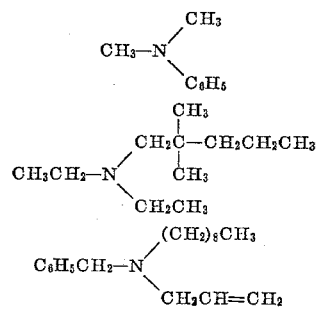

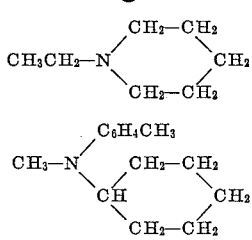

The compounds of Formulas B, C, D, E, F, and G are known and can be prepared by conventional methods.

The novel aminoacetylene compounds of this invention are those represented by Formula A wherein Y is a $NR_2$ group. Thus, the novel compounds are those represented by the formula:

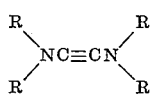

wherein R has the meaning defined hereinabove. The compounds of Formula H can be prepared according to the process of this invention by the reaction of a compound of Formula E, as described hereinabove, with a compound of Formula F, where M is an alkali metal. Different $NR_2$ groups in the same molecule can be obtained by using mixtures of compounds of Formula F.

Typical novel compounds of Formula H are those having the formulas:

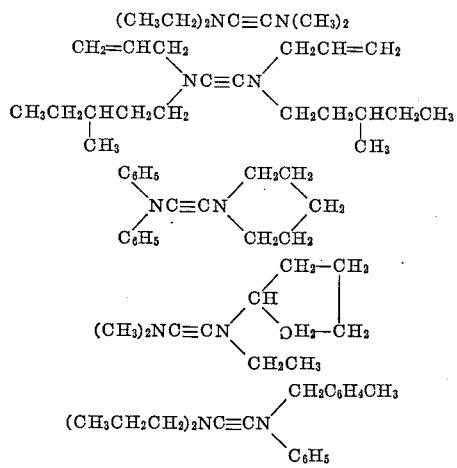

Throughout the present specification and claims, $C_6H_5$ represents the phenyl group, $C_6H_4$ represents the phenylene group and i-$C_4H_9$ represents the isobutyl group. Also, the Y group in Formula A can be defined as representing an R′ group or an $NR_2$ group.

The process of this invention can be carried out by mixing together the solvent, the compound of Formulas B, C, D, or E, and the compound of either Formula F or Formula G in any convenient order, and maintaining the reaction mixture at a temperature between −25° C. and 150° C. until a compound of Formula A is produced. Preferably the reaction mixture is stirred during the course of the reaction.

It is preferable to carry out the reaction under anhydrous conditions and in the absence of oxygen. This can be conveniently done by carrying out the reaction under an atmosphere of inert gas, such as nitrogen, argon, helium, and the like.

Organic solvents useful in the process of this invention include non-protic solvents such as hydrocarbons, hydrocarbon ethers, and tertiary amines represented by Formula G hereinabove. Illustrative solvents include hydrocarbons such as petroleum ether, cyclohexane, 2-ethylhexane, benzene, toluene, xylene and the like, and ethers such as diethyl ether, di-isopropyl ether, methylbutyl ether, dioxane, tetrahydrofuran, ethylene glycol dimethyl ether, diethylene glycol dimethyl ether, and the like, and tertiary amines of Formula G hereinabove.

Where a compound of Formula G is used in the process of this invention it is convenient to use an excess of this compound as a solvent.

Where one or more reactants are highly volatile, for example, $C_6H_5CH=CClF$ or $HFC=CCl_2$, it is convenient to form the reaction mixture at a temperature of −80° C. or below and then allow the mixture to warm to a reaction temperature above −25° C.

The process of this invention can also be carried out using a mixture of two or more compounds of Formulas B, C, D, and E, a mixture of two or more compounds of Formulas F and G or two such respective mixtures. For example, the reaction of $C_6H_5CH=CFCl$ with a mixture of $LiN(CH_3)_2$ and $N(CH_3)_3$ gives primarily $$C_6H_5C\equiv CN(CH_3)_2$$

while the reaction of $C_6H_5CH=CFCl$ with a mixture of $LiN(CH_2CH_3)_2$ and $N(CH_3)_3$ gives a mixture of $$C_6H_5C\equiv CN(CH_3)_2$$

and $C_6H_5C\equiv CN(CH_2CH_3)_2$. The relative amounts of products in such product mixtures depend on the relative reactivities of the compounds in the mixture of reactants. In such reactant mixtures, the compound of Formula G can be both a reactant and a solvent.

Where a compound of Formula G is used in the process of this invention and the R groups are not all the same, the primary product will depend on which nitrogen-R group bond is most easily broken. It has been found, for example, that a typical order of decreasing ease of R-N bond breaking is allyl-N, benzyl-N, methyl-N, ethyl-N, and n-propyl-N. Thus, the reaction of $C_6H_5CH=CFCl$ with

yields primarily

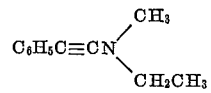

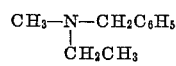

When a solvent is a hydrocarbon or hydrocarbon ether, the preferred reaction temperatures are −25° C. to 20° C., and when the solvent is a tertiary amine, higher temperatures up to 150° C. are preferred.

There is no particular advantage to be gained in carrying out the reaction at pressures other than atmospheric pressure. However, when a sealed reaction vessel is employed, the autogenous pressure of the reaction mixture at the reaction temperature is satisfactory.

Formation of the compound of Formula A in good yield generally takes from a few minutes up to several days depending on the particular temperature, solvent and reactants.

It is preferable to use equimolar quantities of reactants or a slight excess of the compound of Formula F or Formula G. "Equimolar quantities" in the process of this invention means one gram mole of compound of Formulas F or G per gram atom of halogen in the compounds of Formulas B, C, D, or E.

The reaction product is separated from the reaction mixture by conventional methods which include separation of liquid from precipitated salts and other solids, and isolation of the desired product by evaporation of solvent. Fractional distillation, and the like. Product separation is preferably carried out under an inert atmosphere. Several methods of product recovery are illustrated in the examples hereinbelow.

In summary, the process of this invention comprises the steps of (1) mixing together in a non-protic liquid organic solvent (a) one or more compounds represented by formulas (I) 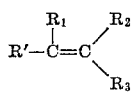

wherein R' has the meaning defined hereinabove with reference to Formulas B–E, any two of $R_1$, $R_2$ and $R_3$ are any halogen and the remaining group $R_1$, $R_2$ or $R_3$ is hydrogen, and (J) 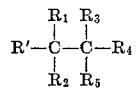

wherein R' has the meaning defined hereinabove with reference to Formulas B–E, any three of $R_1$, $R_2$, $R_3$, $R_4$ and $R_5$ are any halogen and the remaining two groups of $R_1$, $R_2$, $R_3$, $R_4$ and $R_5$ are hydrogen, and (b) one or more compounds represented by one of the Formulas F and G hereinabove, and (2) maintaining this mixture at a temperature between about —25° C. and about 150° C. until a compound of Formula A is produced.

The process of this invention can also be carried out using compounds of the formulas (K) 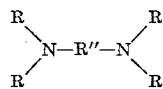

and (L) 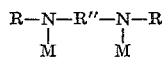

instead of or in admixture with compounds of Formulas F and G.

In Formulas K and L, R and M have the meanings defined hereinabove with reference to Formulas A, F and G, and R'' is a divalent hydrocarbon group such as ethylene, 1,2-propylene, 1,4-butylene, 1,4-cyclohexylene, para-phenylene and the like.

When compounds of Formulas K and L are used in the process of this invention, the aminoacetylene product has the structure represented by formula (M) 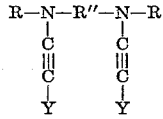

where R, R'' and Y have the meanings defined hereinabove. For example, the reaction of

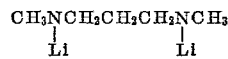

and $C_6H_5CH=CCl_2$ gives

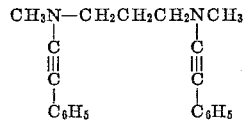

The compounds of Formulas K and L are known and can be prepared by conventional methods.

All of the compounds of Formula A and Formula M react with hydrogen halides with the formation of hydrogen halide salts and are therefore useful under anhydrous conditions as hydrogen halide acceptors. For example, all of the compounds of Formulas A and M can be used as hydrogen halide acceptors in the process for producing cyclopentadienyl metal compounds described in Morehouse, U.S. Patent 3,071,605, issued Jan. 1, 1963.

The following examples are illustrative of the invention.

*Example 1.—Phenyl-diethylaminoacetylene*

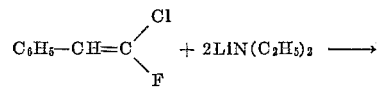

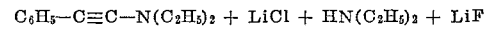

A 2.3 g. portion of beta-fluoro-beta-chlorostyrene was dripped into 44 millimoles of lithium diethylamide in 75 cc. diethyl ether with stirring in a nitrogen atmosphere at —80° C. and the mixture was allowed to warm to room temperature. After distilling off the ether, the residue was fractionally distilled in a bulb-tube at 0.1 mm. Hg and a bath temperature of 80–90° C. Yield of 1-phenyl-2-diethylamino acetylene was 2.1 g. or 86% of theoretical. Redistillation gave a product with the following data:

Boiling point about 72° C. at 0.02 mm. Hg.

*Analysis.*—$C_{12}H_{15}N$: C, 83.21% (calc. 83.15); H, 8.66 (8.72); N, 8.19 (8.08).

Principal acetylene band in the infrared spectrum at 4.6 microns.

The identical product is obtained using triethylamine at a reaction temperature of 125° C. instead of lithium diethylamide at room temperature.

*Example 2.—Phenyl-dimethylaminoacetylene*

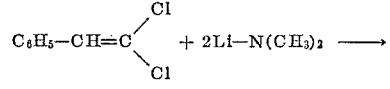

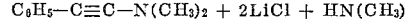

A solution of 2.6 g. (15 millimoles) beta,beta-dichlorostyrene in 15 cc. diethylether was added at —80° C. as described in Example 1 to 45 millimoles lithium dimethylamide in 35 cc. diethyl ether and warmed to room temperature. After removal of the ether, the residue was fractionally distilled at 0.2 mm. Hg at about 130° C. bath temperature. Yield of 1-phenyl-2-dimethylaminoacetylene was 1.8 g. or 82% of theoretical.

Analysis of the product:

Boiling point: about 60° C. at 0.08 mm. Hg.

Principal acetylene band in the infrared spectrum (C≡C-stretching), 4.54 microns.

*Analysis.*—$C_{10}H_{11}N$ (m.w. 145.2): C, 83.15% (calc. 82.72); H, 7.44 (7.63); N, 9.68 (9.65).

The identical product is obtained using

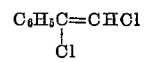

in the process of Example 2 instead of $C_6H_5CH=CCl_2$.

*Example 3.—t-Butyl-dimethylaminoacetylene*

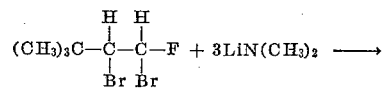

A solution of 35 g. of 1,2-dibromo-1-fluoro-2-t-butylethane in 50 cc. diethyl ether were added at —80° C. with stirring to 0.54 millimole lithium dimethylamide in 500 cc. diethyl ether. After warming to room temperature the ether was distilled off very carefully using a spinning band fractionating column after which 8 g. t-butyl-dimethylaminoacetylene (B.P. 122–124° C., 48% yield) were distilled and recovered. The product was identified by infra-red spectrographic analysis.

*Example 4.—Bis-diisobutylaminoacetylene*

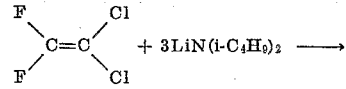

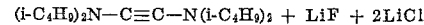

A solution of 1.73 g. (15 millimoles) of 1,1-dichloro-2-fluoroethylene in 10 cc. diethyl ether solution dropped at −80° C. with stirring into 75 millimoles lithium diisobutylamide in 50 cc. diethyl ether over a period of 5 minutes. The reaction mixture was then allowed to warm at room temperature, and was stirred for a further 3 hours at room temperature. The ether was evaporated and then the residue was fractionally distilled to give 2.3 g. (55% of theoretical yield) of bis-diisobutylaminoacetylene, B.P. about 110° C. at 0.02 mm. Hg. The product was identified by infrared spectrographic analysis and molecular weight determination (by field ion mass spectrometry) m.w. 280 (cal. 280.5).

*Example 5.—Bis-diethylaminoacetylene*

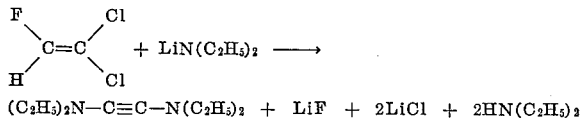

$(C_2H_5)_2N-C\equiv C-N(C_2H_5)_2 + LiF + 2LiCl + 2HN(C_2H_5)_2$

A solution of 2 g. (174.4 millimoles) of 1,1-dichloro-2-fluoroethylene in 25 cc. diethyl ether were dropped at −80° C. into 87 millimoles lithium diethylamide in 70 cc. diethyl ether over a 5-minute period. After warming to room temperature, the ether was evaporated and then the residue was fractionally distilled to give 1.79 g. (57% of theoretical yield) of bis-diethylaminoacetylene, B.P. 86° C. at 16 mm. Hg. Identification of product:

*Analysis.*—$C_6H_{20}N_2$: C, 71.08% (calc. 71.31); H, 11.85 (11.97); N, 16.54 (16.73). Molecular weight by field ion mass spectrometry, 168 (calc. 168.3).

*Example 6.—Diethylaminoacetylene*

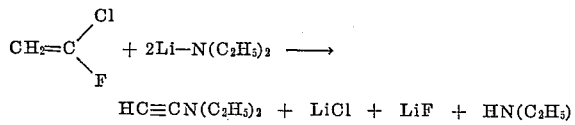

$HC\equiv CN(C_2H_5)_2 + LiCl + LiF + HN(C_2H_5)$

About 0.8 g. of 1-chloro-1-fluoroethylene was distilled at −180° C. in vacuum into 20 millimoles lithium diethylamide in 20 cc. diethyl ether. On slow warming to room temperature, reaction began between −15 and +5° C. and was complete after 2 hours at room temperature. The product, diethylaminoacetylene, was identified by infrared spectrographic analysis.

What is claimed is:
1. Compounds represented by the formula

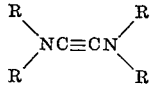

wherein each R represents a monovalent hydrocarbon group containing from one to about 18 carbon atoms, two R groups on the same nitrogen atom can together form an alkylene group.

2. The compound bis-diisobutylaminoacetylene,

3. The compound bis-diethylaminoacetylene,

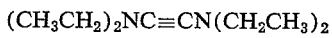

4. The process which comprises (1) mixing together in a solvent selected form the class consisting of hydrocarbons, hydrocarbon ethers and tertiary-amines represented by Formula IV hereinbelow (a) a compound selected from the class consisting of compounds represented by the formulas (I)

and (II)

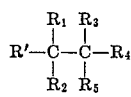

wherein R' in Formulas I and II is selected from the class consisting of hydrogen and monovalent hydrocarbon groups containing from one to about 18 carbon atoms, in Formula I any two of $R_1$, $R_2$ and $R_3$ are halogen and the remaining group $R_1$, $R_2$ and $R_3$ is hydrogen, and in Formula II any three of $R_1$, $R_2$, $R_3$, $R_4$, and $R_5$ are halogen and the remaining two groups of $R_1$, $R_2$, $R_3$, $R_4$ and $R_5$ are hydrogen, and (b) a compound selected from the class consisting of compounds represented by the formulas (III)

and (IV)

wherein M is an alkali metal, each R group is a monovalent hydrocarbon group containing from one to about 18 carbon atoms, and two R groups on the same nitrogen atom can together form an alkylene group, and (2) maintaining said mixture at a temperature between about −25° C. and 150° C. until a compound represented by the formula (V)

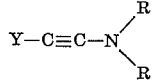

wherein R has the meaning as defined hereinabove and Y is selected from the class consisting of R' groups, as defined hereinabove, and $NR_2$ groups, is produced.

5. The process which comprises (1) mixing together in a solvent selected from the class consisting of hydrocarbons, hydrocarbon ethers and tertiary-amines represented by Formula VI hereinbelow (a) a compound selected from the class consisting of compounds represented by the formulas (I)

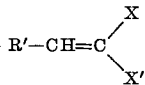

(II)

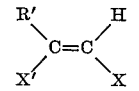

(III)

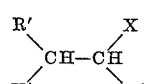

and (IV)

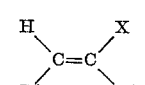

wherein R' is selected from the class consisting of hydrogen and monovalent hydrocarbon groups containing from one to about 18 carbon atoms, X is selected from the class consisting of fluorine and chlorine and X' is a halogen, and (b) a compound selected from the class consisting of compounds represented by the formulas (V)

and (VI)

wherein M is an alkali metal, each R group is a monovalent hydrocarbon group containing from one to about 18 carbon atoms, and two R groups on the same nitrogen atom can together form an alkylene group, and (2) maintaining said mixture at a temperature between about −25° C. and 150° C. until a compound represented by the formula (VII)   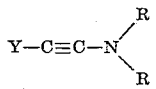

wherein R has the meaning defined hereinabove and Y is selected from the class consisting of R′ groups, as defined hereinabove, and $NR_2$ groups, is produced.

6. The process which comprises (1) mixing together in a solvent selected from the class consisting of hydrocarbons, hydrocarbon ethers and tertiary-amines represented by Formula VI hereinbelow (a) a compound selected from the class consisting of compounds represented by the formulas (I)   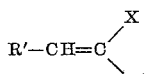

(II)   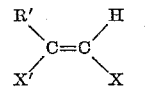

(III)   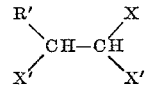

and (IV)   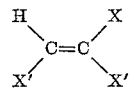

wherein R′ is a monovalent hydrocarbon group containing from 4 to about 18 carbon atoms and connected to the acetylenic moiety through a tertiary carbon atom of said R′ group, X is selected from the class consisting of fluorine and chlorine, X′ is a halogen, and (b) a compound selected from the class consisting of compounds represented by the formulas (V)   

and (VI)   

wherein M is an alkali metal, each R group is a monovalent hydrocarbon group containing from one to about 18 carbon atoms, and two R groups on the same nitrogen atom can together form an alkylene group, and (2) maintaining said mixture at a temperature between about −25° C. and 150° C. until a compound represented by the formula (VII)   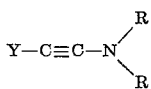

wherein R has the meaning defined hereinabove and Y is selected from the class consisting of R′ groups, as defined hereinabove, and $NR_2$ groups, is produced.

7. The process which comprises mixing together in diethyl ether solvent beta-fluoro-beta-chlorostyrene and lithium diethylamide and maintaining said mixture at room temperature until phenyl-dimethylaminoacetylene is produced.

8. The process which comprises mixing together in diethyl ether solvent 1,2-dibromo-1-fluoro-2-t-butylethane and lithium dimethylamide and maintaining said mixture at room temperature until t-butyl-dimethylaminoacetylene is produced.

9. The process which comprises mixing together in diethylether solvent 1,1-dichloro-2-fluoroethylene and lithium diethylamide and maintaining said mixture at room temperature until bis-diethylaminoacetylene is produced.

References Cited
UNITED STATES PATENTS 2,830,048  4/1958  Biel _____ 260—583 X
3,268,524  8/1966  Moore et al. _____ 260—583 X

OTHER REFERENCES

Viehe, Angew. Chem., vol. 75, p. 638 (1963).

FLOYD D. HIGEL, *Primary Examiner.*